(12) United States Patent
Thalmann

(10) Patent No.: US 8,163,178 B2
(45) Date of Patent: Apr. 24, 2012

(54) FILTER

(75) Inventor: Christian Thalmann, Speyer (DE)

(73) Assignee: Mann+Hummel GmbH, Ludwigsburg (DE)

( * ) Notice: Subject to any disclaimer, the term of this patent is extended or adjusted under 35 U.S.C. 154(b) by 401 days.

(21) Appl. No.: 12/464,605

(22) Filed: May 12, 2009

(65) Prior Publication Data

US 2010/0116729 A1 May 13, 2010

(30) Foreign Application Priority Data

May 16, 2008 (DE) .................. 20 2008 006 721 U

(51) Int. Cl.
*B01D 29/00* (2006.01)
(52) U.S. Cl. ........................ 210/232; 210/248
(58) Field of Classification Search .................. 210/232, 210/416.1, 435, 450, 248
See application file for complete search history.

(56) References Cited

U.S. PATENT DOCUMENTS

| | | | | |
|---|---|---|---|---|
| 4,312,751 | A | * | 1/1982 | Casamitjana .................. 210/94 |
| 5,122,167 | A | * | 6/1992 | Daniels ........................ 95/273 |
| 5,236,579 | A | * | 8/1993 | Janik et al. ................... 210/94 |
| 2007/0034580 | A1 | | 2/2007 | Stein |
| 2007/0114170 | A1 | | 5/2007 | Krull |

FOREIGN PATENT DOCUMENTS

| | | |
|---|---|---|
| DE | 3941996 A1 | 6/1991 |
| DE | 3941996 A1 | 6/1991 |
| DE | 102005000658 A1 | 7/2006 |
| DE | 102005000658 A1 | 7/2006 |
| EP | 0529286 | 3/1993 |
| EP | 0529286 A1 | 3/1993 |
| EP | 0529286 B1 | 3/1993 |
| FR | 2851477 | 8/2004 |
| WO | WO2005079949 | 9/2005 |

OTHER PUBLICATIONS

EP Search Report EP09159487, reported dated: Aug. 19, 2009.
German patent office search report of application No. 20 2008 006 721.9, dated Apr. 16, 2009.

* cited by examiner

*Primary Examiner* — Fred Prince
(74) *Attorney, Agent, or Firm* — James Hasselbeck

(57) ABSTRACT

A filter has a filter housing having an interior. A drainage device is provided that has a collecting cup, a fastening screw for the collecting cup, and a threaded part secured in the filter housing and provided with an inner thread for receiving the fastening screw. The threaded part has an outer surface with at least one drainage passage connecting the interior of the filter housing to the collecting cup. The filter housing has a cup-shaped receptacle for the threaded part and the cup-shaped receptacle has a securing wall that at least partially extends about a circumference of the cup-shaped receptacle. The threaded part is a press-fit bushing pressed into the receptacle. The press-fit bushing has a circumferential wall provided with a circumferential contact surface secured by the securing wall and extending at least partially about a circumference of the press-fit bushing.

12 Claims, 2 Drawing Sheets

FILTER

CROSS REFERENCE TO RELATED APPLICATIONS

This application claims the benefit under 35 USC 119 of foreign application DE 20 2008 006 721.9 filed in Germany on May 16, 2008, and which is hereby incorporated by reference in its entirety.

TECHNICAL FIELD

The present invention relates to a filter, in particular a fuel filter, for a motor vehicle.

BACKGROUND OF THE INVENTION

A motor vehicle fuel filter includes a filter housing and a drainage device wherein the drainage device includes a collecting cup, a fastening screw for the collecting cup, as well as a threaded part secured in the filter housing and including an inner thread for receiving the fastening screw. On the exterior of the threaded part at least one drainage passage extends from the interior of the filter housing into the collecting cup.

Filters for liquids have often in addition to their primary filtering function also the task of acting as a water separator. In particular in case of fuel filters of motor vehicles, the filter housing is provided for this purpose with a drainage device for removing water that has collected. In this connection, the higher specific gravity of water relative to fuel is utilized in order to collect the entrained water at the bottom of the filter housing, in the direction of gravity, and to guide it by means of a drainage device to a collecting cup.

WO 2005/079949 A1 discloses such a filter in which at the bottom side of the filter housing a collecting cup threadably attached or screwed on by means of a central fastening screw. The filter housing has at its bottom end, relative to the force of gravity, a threaded part with an inner thread for receiving the fastening screw. The threaded part is embodied as a block with square cross-section and is positioned on radially inwardly projecting noses of a securing element that has a round cross-section. The securing element is provided with tabs that are bent about the parallelepipedal threaded part and thus positionally secure the threaded part. The assembly of the round securing element and the parallelepipedal threaded part is inserted into the bottom end of the filter housing and, in the inserted state, is ready for receiving the fastening screw of the collecting cup. Between the circumferential surfaces of the threaded part arranged in a square and the receptacle of circular cross-section, there are drainage passages formed on the exterior of the threaded part; these drainage passages have the shape of a segment of a circle and extend from the interior of the filter housing into the collecting cup and enable drainage of water from the interior of the filter housing into the collecting cup.

In this connection, the high constructive expenditure is disadvantageous in that, in addition to the filter housing, two components, i.e., the round securing element and the parallelepipedal threaded part are required and that the threaded part must be secured in a complicated way by bending the securing tabs. In particular, the tightening forces of the fastening screw and also other external force effects can cause local stress peaks at the noses of the receptacle where the threaded part is resting. An accidental eccentric loading can also lead to stress in the corner area of the parallelepipedal threaded part which corner area has no or at most a linear contact surface on the circumferential wall of its receptacle. A thin-walled construction of the filter housing, in particular made from plastic material, is therefore not possible or possible only with limitations.

Thus, the need exists to provide a filter of the aforementioned kind configured in such a way that the attachment of the collecting cup on the filter housing is improved with regard to carrying capacity and liquid flow rate.

SUMMARY OF THE INVENTION

In accordance with the present invention, the above need is achieved in that the filter housing has a cup-shaped receptacle for the threaded part that is provided with a securing wall that extends at least partially in the circumferential direction and in that the threaded part is configured as a press-fit bushing that is pressed into the receptacle and has a circumferential wall with a circumferential contact surface that extends at least partially in the circumferential direction and is secured by the securing wall.

A filter is proposed with which the mounting expenditure is significantly reduced in comparison to the prior art. The press-fit bushing is pressed axially into the receptacle wherein positioning of the press-fit bushing and its attachment are realized in a single working step. A separate attachment by bending securing tabs or the like is not required. In particular, by means of the areal pressure contact of the circumferential contact surface on the securing wall of the receptacle a uniform areally distributed force transmission is provided that prevents stress peaks and is highly loadable. This enables in particular the unitary configuration of the receptacle for the press-fit bushing and the bottom of the filter housing without a separate insertion part. Because of the areal force transmission the filter housing and the receptacle for the press-fit bushing can be designed to have thin walls and to be lightweight.

It can be expedient that the circumferential contact surface formed on the circumferential wall of the press-fit bushing is designed to extend completely about the circumference, wherein the at least one drainage passage is formed in the outer securing wall of the receptacle for the press-fit bushing. In a preferred embodiment at least one drainage passage is provided in the circumferential wall of the press-fit bushing. The appropriate shaping can be realized in a simple way on the press-fit bushing wherein the rotational angle position of the press-fit bushing relative to the cylindrical or slightly conical receptacle is not important.

It can be advantageous to provide one or several drainage passages. In a preferred embodiment, relative to a longitudinal axis of the press-fit bushing two drainage passages are provided diametrically opposite one another. The circumferential wall of the press-fit bushing is interrupted by the incorporated drainage passage only at two locations so that as a whole two circumferential contact surfaces of a large surface area remain on the circumferential wall. The symmetric diametrically opposed arrangement effects likewise a symmetrical canting-free force introduction.

In a particularly preferred embodiment the drainage passage is formed by a flattened portion of the circumferential wall that is in particular planar. The flattened portion can be produced easily in regard to manufacturing technology and produces also a large flow cross-section of the drainage passage. Alternatively, it can be advantageous that the drainage passage is formed by a longitudinal groove that is incorporated into the circumferential wall. In this way, only a minimal amount of material is removed from the originally unaffected particularly cylindrical or conical circumferential surface with respect to the desired flow cross-section of the drainage passage so that comparatively large circumferential contact surfaces remain on the circumferential wall with corresponding minimal surface pressure and carrying load.

It can be expedient to provide for the press-fit bushing and its receptacle a non-round, for example, rectangular, cross-section. Preferably, the circumferential contact surface and the matching securing wall of the receptacle have in cross-section the shape of a segment of a circle and in particular the shape of a segment of a cylinder. For example, a conical, in particular however, a cylindrical circumferential contour results that enables mounting independent of the rotational angle. At the same time, a high shape stability in the area of the securing wall is provided that enables a great carrying load even for a thin-walled construction.

In an advantageous further embodiment a bottom of the cup-shaped receptacle of the filter housing is secured by clamping action between the press-fit bushing and the collecting cup. Between the head of the fastening screw and the press-fit bushing material is arranged continuously along a straight axis-parallel stress line which material serves as a supporting intermediate layer. The bottom of the cup-shaped receptacle is supported in this way and experiences, aside from the surface pressure, no other load, for example, bending load. Tightening of the fastening screw cannot lead to overloading the filter housing in the area of the cup-shaped receptacle.

In a preferred embodiment, the circumferentially extending securing wall of the cup-shaped receptacle of the filter housing is secured in a support ring of the collecting cup. The radially acting pressing forces between the circumferential contact surface of the press-fit bushing and the circumferentially extending securing wall of the receptacle cannot cause, or can cause only to a limited extent, an expansion of the receptacle because the circumferential wall is supported in the radial direction by the support ring.

A further embodiment of the invention provides that the circumferential wall is provided with knurling. In this way, an improved anti-rotation action is ensured.

BRIEF DESCRIPTION OF THE DRAWINGS

The accompanying Figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Features of the present invention, which are believed to be novel, are set forth in the drawings and more particularly in the appended claims. The invention, together with the further objects and advantages thereof, may be best understood with reference to the following description, taken in conjunction with the accompanying drawings. The drawings show a form of the invention that is presently preferred; however, the invention is not limited to the precise arrangement shown in the drawings.

Figure 1:
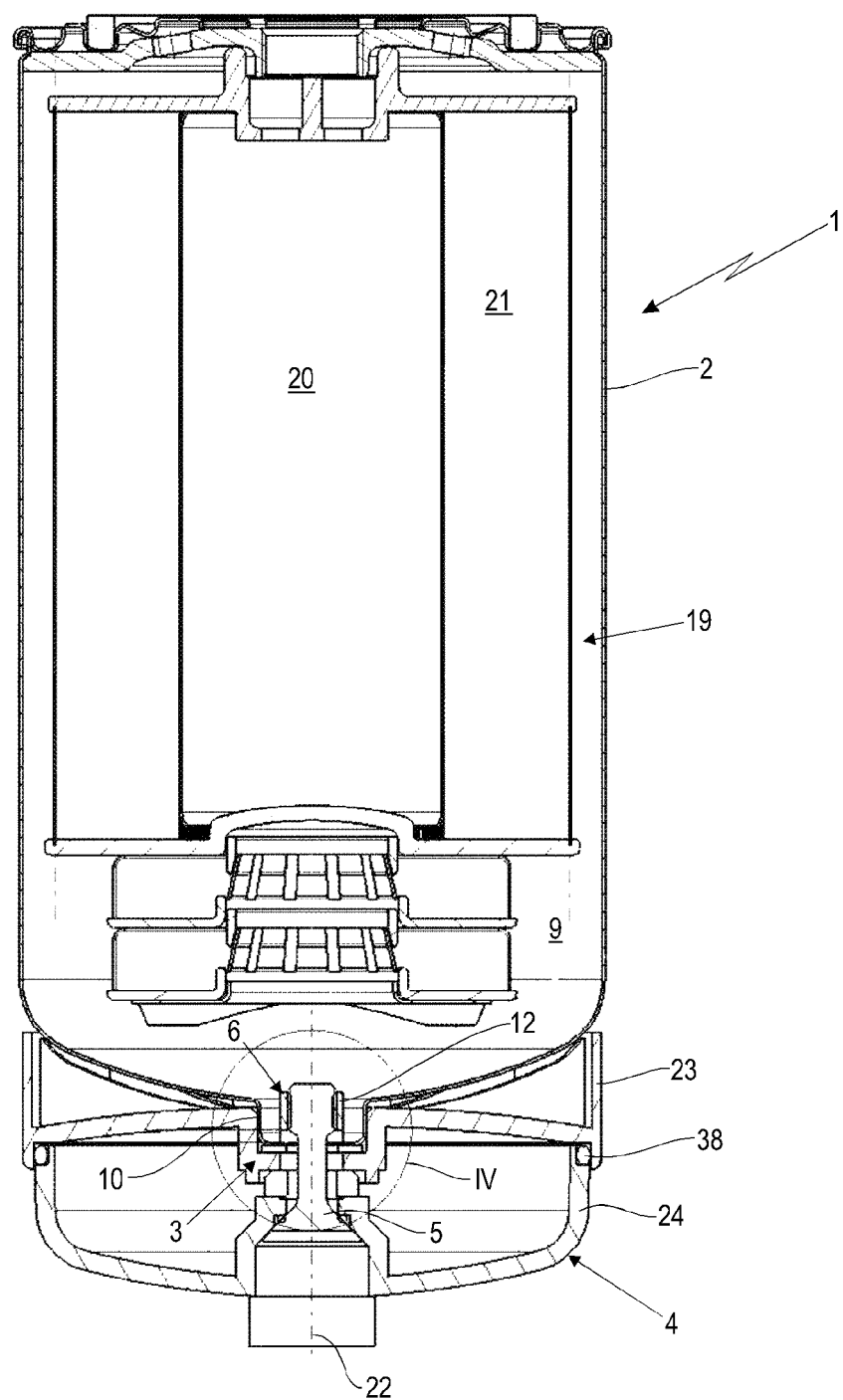
FIG. 1 shows a longitudinal section illustration of a filter according to the invention with a collecting cup screwed to the filter housing and with a press-fit bushing pressed into the filter housing.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of apparatus components related to a filter. Accordingly, the apparatus components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "includes," "including," or any other variation thereof, are intended to cover a non-exclusive inclusion, such that a process, method, article, or apparatus that includes a list of elements does not include only those elements but may include other elements not expressly listed or inherent to such process, method, article, or apparatus. An element proceeded by "includes . . . a" does not, without more constraints, preclude the existence of additional identical elements in the process, method, article, or apparatus that includes the element.

FIG. 1 shows in longitudinal section a filter for liquids with a water separator wherein in the illustrated embodiment a fuel filter 1 of a motor vehicle is shown However, other types of filters with a corresponding separator can be provided with the features according to the invention.

The fuel filter 1 is substantially of rotational symmetry relative to the longitudinal axis 22 and includes a filter housing 2 whose central area is cylindrical and that surrounds the interior 9. In the interior 9 a filter element 21 that is also substantially cylindrical is arranged which divides the interior 9 into a radially outwardly positioned unfiltered side 19 and a radially inwardly positioned filter side 20. In operation, the fuel entering the interior 9 passes from the unfiltered side 19 radially inwardly through the filter element 21 to the filtered side 20 and exits from there. The fuel is cleaned or filtered as it passes through the filter element 21.

The fuel filter 1 illustrated here is designed as a suspended filter wherein the longitudinal axis 22 is positioned at least approximately parallel to the action of the force of gravity and wherein, relative to the action of the force of gravity, at the lower end of the filter housing 2 a separator for water or the like is arranged that includes a drainage device 3 and a collecting cup 4.

The collecting cup 4 includes a top part 23 and a bottom part 24 that is coaxially arranged relative to the top part 23, wherein the bottom part 24 engages seal-tightly the top part 23 by means of a circumferential seal 38. Centrally arranged coaxially to the longitudinal axis 22 there is a fastening screw 5 passing through the collecting cup 4 and screwed into the bottom of the filter housing 2. In this way, the bottom part 24 is pressed against the top part 23 and at the same time the collecting cup 4 as a whole is screwed to the filter housing 2.

The bottom of the filter housing 2 has an integrally formed cup-shaped receptacle 10 in which a threaded part 6 is secured wherein the fastening screw 5 is screwed into the threaded part 6. The threaded part 6 is configured as a press-fit bushing 12 that will be explained in more detail in connection with FIGS. 2 and 3 and is pressed into the cup-shaped receptacle 10. The press-fit bushing 12 is part of drainage device 3 which in FIG. 1 is identified as detail IV and will be explained in more detail in connection with FIG. 4.

Figure 2:
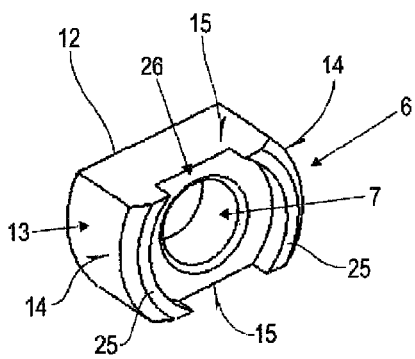
FIG. 2 shows in a perspective illustration the press-fit bushing according to FIG. 1 with circumferentially extending flattened portions for forming the drainage passages.

FIG. 2 shows in a perspective view a first embodiment of the threaded part 6 formed as a press-fit bushing, as shown in FIG. 1. The press-fit bushing 12 is manufactured of a cylindrical base member; however, a conical design can also be expedient. Centrally and coaxially the press-fit bushing 12 is provided with an inner thread 7 for receiving the threaded section of the fastening screw 5 (FIG. 1). A circumferential wall 13 that is produced from the cylindrical contour includes two planar flattened portions 15 that, relative to the longitudinal axis 22, are positioned diametrically opposite one another and that, along the circumferential wall 13, are connected to one another by two also diametrically oppositely positioned circumferential contact surfaces 14. The circumferential contact surfaces 14 in cross-section have the shape of a segment of a circle and, as a result of the cylindrical base contour of the press-fit bushing 12 they have the shape of a segment of a cylinder; they serve for securing the threaded part 6 in the receptacle 10 of FIG. 1 by clamping action. In addition, and for enhancing the clamping action, the circumferential contact surface 14 can be provided with a surface structure, for example, in the form of knurling. In an alternative embodiment as a cone, the contact surfaces 14 also have the shape of a segment of a circle in cross-section.

The illustration according to FIG. 2 also shows that the press-fit bushing 12 is provided on one of its end faces with two axially projecting ring sections 25. The two flattened portions 15 are positioned radially inwardly so far that the two ring sections 25 in the circumferential direction do not contact one another but that between them in the area of the flattened portions 15 two oppositely positioned radial passages 26 are formed.

Figure 3:
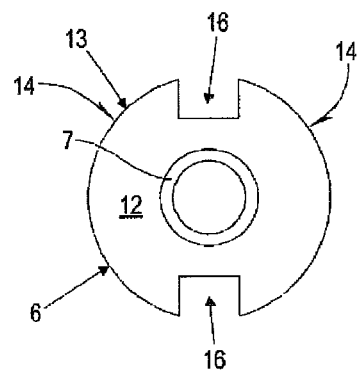
FIG. 3 shows in a plan view a variant of the press-fit bushing according to FIG. 2 with circumferentially incorporated grooves for forming the drainage passages.

FIG. 3 shows in a schematic plan view of an alternative embodiment of the threaded part 6 embodied as a press-fit bushing 12. Instead of the flattened portions 15 illustrated in FIG. 2, two diametrically opposed longitudinal grooves 16 are incorporated axis-parallel to the threaded part 6 in the cylindrical circumferential contour of the circumferential wall 13 so that in this embodiment two contact surfaces 14 are also formed that have the shape of a segment of a circle. In regard to other features and reference numerals the embodiment according to FIG. 3 is identical to that of FIG. 2. In both cases it is required that at least one flattened portion 15 or longitudinal groove 16 is to be provided. It is also possible to provide a greater number of such flattened portions 15 or grooves 16.

Figure 4:
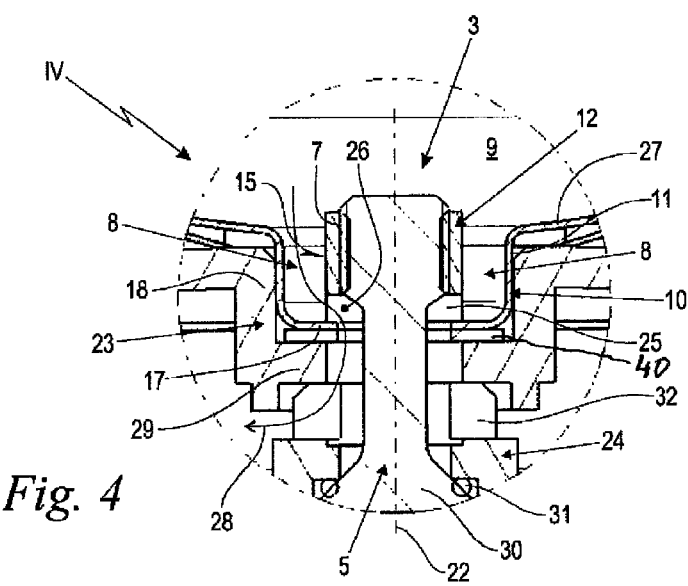
FIG. 4 shows an enlarged illustration of detail IV according to FIG. 1 with details of the mutual interaction of filter housing, collecting cup, and press-fit bushing.

FIG. 4 shows the detail IV according to FIG. 1 illustrating the drainage device 3 in more detail. The cup-shaped receptacle 10 is an integral part of the bottom 27 of the filter housing 2 (FIG. 1) and includes a bottom 17 at the lower end relative to the longitudinal axis 22 or the direction of the force of gravity. The bottom 17 is adjoined in the circumferential direction and in the upward direction by a cylindrical circumferentially extending securing wall 11. The inner diameter of the securing wall 11 has relative to the outer diameter of the circumferential contact surfaces 14 of the press-fit bushing 12 (FIGS. 2, 3) a diameter that is reduced so minimally that between them in the mounted state a press-fit is produced. The cup-shaped receptacle 10 is open in the upward direction toward the interior 9 of the filter housing 2 (FIG. 1). The press-fit bushing 12 is inserted, with its ring sections leading, from above into the cup-shaped receptacle 10 and is press-fit in this way. The circumferential contact surfaces 14 (FIG. 2) rest with radially acting pressure against the inner side of the circumferential securing wall 11 so that the press-fit bushing 12 is secured by a clamping force in the cup-shaped receptacle 10. A circumferentially extending support ring 18 is integrally formed in the top part 23 of the collecting cup 4 (FIG. 1) and surrounds the securing wall 11 of the receptacle 10 radially outwardly without play and supports it relative to the pressing forces on the circumferential surfaces 14 (FIG. 2). Between the bottom 17 and the support flange 29 a flat seal 40 is provided as shown in the Figure.

In the direction of the longitudinal axis 22 the press-fit bushing 12 rests with its axially projecting ring sections 25 against the bottom 17 of the receptacle 10 and in this way is axially supported. On the oppositely positioned axial side of the bottom 17, a support flange 29 extends from the support ring 18 of the top part 23 radially inwardly and rests with its entire surface area on the entire circumference of the bottom 17 of the receptacle 10. The bottom part 24 of the collecting cup 4 (FIG. 1) is provided in the area of its receptacle with axially projecting supports 32 for a screw head 30 of the fastening screw 5 that are resting against the support flange 29. The fastening screw 5 rest with its screw head 30 with intermediate positioning of a circumferential sealing ring 31 in the axial direction against the receptacle of the bottom part 24 for the screw head 30 and is inserted with its opposite threaded section into the inner thread 7 of the press-fit bushing 12. In the tightened state of the fastening screw 5, a continuous straight force path parallel to the longitudinal axis 22 is provided from the screw head 30 through the support noses 32 of the bottom part 24, the support flange 29 of the top part 23, and the bottom 17 of the receptacle 10 into the ring sections 25 of the press-fit bushing 12 wherein the bottom 17 of the cup-shaped receptacle 10 is secured by clamping action between the press-fit bushing 12 and the collecting cup 4 (FIG. 1) so that axial bulging of the bottom 17 under load is prevented.

The illustration according to FIG. 4 also shows that by means of the flattened portions 15 or, alternatively, by means of the longitudinal grooves 16 according to FIG. 3 on the exterior of the press-fit bushing 12, between the bushing 12 and the securing wall 11 a corresponding number of drainage passages 8 is formed. The drainage passages 8 are positioned, like the flattened portions 15 or the longitudinal grooves 16, relative to the longitudinal axis 22, diametrically opposed to one another. They open upwardly into the interior 9 and continue in the opposite direction through the radial passages 26 as well as openings in the bottom 17 and in the support flange 29 between the support noses 32. Accordingly, the water separated from the fuel can flow in the direction of arrow 28 from the interior 9 into the collecting cup 4 (FIG. 1) by utilizing the higher specific gravity in comparison to fuel and can be collected therein. Alternatively, it can also be expedient to design the circumferential contact surface 14 (FIGS. 2, 3) in the circumferential direction without interruption by flattened portions 15, longitudinal grooves 16 or the like wherein then the drainage passages 8 in the securing wall 11 of the receptacle 10 are to be formed radially outwardly of the press-fit bushing 12.

Figure 5:
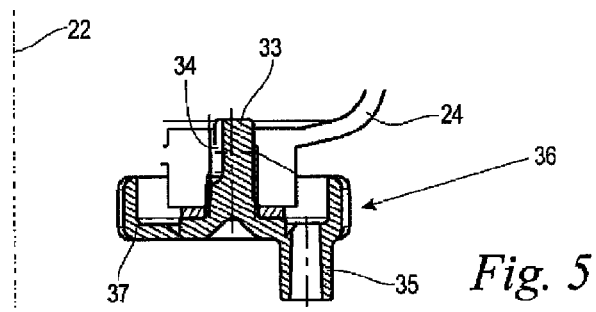
FIG. 5 shows the radially outer end face area of the filter housing according to FIG. 1 with an optional removal device.

With reference to FIG. 1, emptying of the collecting cup 4 is done after unscrewing the fastening screw 5. The collecting cup 4 can then be removed from the filter housing 2 wherein the mixture of fuel and water collected in the collecting cup 4 remains initially in the collecting cup 4. Subsequently, the bottom part 24 can be removed from the top part 23 and the entire contents can be disposed of. Alternatively or additionally, the removal device 36 illustrated in FIG. 5 can be provided which is arranged radially outwardly relative to the longitudinal axis 22 in the bottom of the bottom part 24. For this purpose, the removal device 36 has a manually actuatable wheel 37 on which a screw 33 with a longitudinal groove 34 is integrally formed. The screw 33 is screwed into a corresponding threaded receptacle of the bottom part 24. By rotating the wheel 37 by means of the longitudinal groove 34 a fluid communication between the interior of the collecting cup 4 (FIG. 1) and the surroundings can be produced wherein the collected liquid mixture can be removed through the longitudinal groove 34 and an integrally formed drainage nipple 35 into a collecting container or the like.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

The invention claimed is:

1. A filter comprising:
a filter housing having an interior;
a drainage device comprising
a collecting cup,
a fastening screw for said collecting cup, and
a threaded part secured in said filter housing and provided with an inner thread for receiving said fastening screw;
wherein said threaded part has an outer surface with at least one drainage passage connecting said interior of said filter housing to said collecting cup;
wherein said filter housing has a cup-shaped receptacle for said threaded part and said cup-shaped receptacle has a securing wall that at least partially extends about a circumference of said cup-shaped receptacle;
wherein said threaded part is configured as a press-fit bushing pressed into said receptacle, wherein said press-fit bushing has a circumferential wall provided with a circumferential contact surface secured by said securing wall and extending at least partially about a circumference of said press-fit bushing,
wherein said at least one drainage passage is integrally formed in said circumferential wall of said press-fit bushing.

2. The filter according to claim 1, wherein, relative to a longitudinal axis of said press-fit bushing, two of said at least one drainage passage are arranged diametrically opposite one another.

3. The filter according to claim 1, wherein said at least one drainage passage is formed by a flattened portion of said circumferential wall.

4. The filter according to claim 3, wherein said flattened portion of said circumferential wall is planar.

5. The filter according to claim 1, wherein said at least one drainage passage is formed by a longitudinal groove that is integrally formed in said circumferential wall.

6. The filter according to claim 1, wherein said circumferential contact surface in cross-section has a shape of a segment of a circle.

7. The filter according to claim 1, wherein said circumferential contact surface in cross-section has a shape of a segment of a cylinder.

8. The filter according to claim 1, wherein said collecting cup is clamped between a bottom of said receptacle and said fastening screw.

9. The filter according to claim 1, wherein said securing wall of said cup-shaped receptacle is secured on a support ring of said collecting cup.

10. The filter according to claim 1, wherein
said cup shaped receptacle comprises
a top part having a bore for said fastening screw and a support flange provided proximate to and circumferentially about said bore; and
a bottom part sealably engaging with and separable from said top part;
wherein said securing wall of said cup-shaped receptacle is provided on said top part;
wherein said securing wall secures said top part to said support ring of said collecting cup of said filter housing;
wherein said bottom part is provided in an area of its receptacle with axially projecting support noses supportively bridging between said bottom part and said support flange of said top part; and
wherein when said screw is in a tightened state, axial bulging of said cup-shaped receptacle is prevented by conduction of clamping forces through said support noses to said support flange.

11. The filter according to claim 10, wherein
said cup-shaped receptacle is drained by separating said bottom part from said top part;
wherein said top part remains secured to said filter housing;
wherein entire contents to be drained are then contained in said bottom part; and
wherein said entire contents to be drained can then drained from said bottom part, disposed of and said bottom part reengaged with said top part.

12. A filter comprising:
a filter housing having an interior;
a drainage device comprising
a collecting cup,
a fastening screw for said collecting cup, and
a threaded part secured in said filter housing and provided with an inner thread for receiving said fastening screw;
wherein said threaded part has an outer surface with at least one drainage passage connecting said interior of said filter housing to said collecting cup;
wherein said filter housing has a cup-shaped receptacle for said threaded part and said cup-shaped receptacle has a securing wall that at least partially extends about a circumference of said cup-shaped receptacle;
wherein said threaded part is configured as a press-fit bushing pressed into said receptacle, wherein said press-fit bushing has a circumferential wall provided with a circumferential contact surface secured by said securing wall and extending at least partially about a circumference of said press-fit bushing,
wherein said circumferential wall of said press-fit bushing has a circumferential knurling.

* * * * *